United States Patent [19]

Richardson et al.

[11] 4,204,575
[45] May 27, 1980

[54] METHOD OF FOLDING A PLURALITY OF WING SECTIONS OF AN ARTICULATED IMPLEMENT

[75] Inventors: Raymond W. Richardson; Robert E. Burda; John C. Crumrine, all of Cawker City, Kans.

[73] Assignee: Richardson Manufacturing Company, Inc., Cawker City, Kans.

[21] Appl. No.: 955,334

[22] Filed: Oct. 27, 1978

Related U.S. Application Data

[62] Division of Ser. No. 717,501, Aug. 24, 1976, Pat. No. 4,133,341.

[51] Int. Cl.² ............................................. A01B 73/00
[52] U.S. Cl. ........................................ 172/1; 172/311
[58] Field of Search .................... 172/1, 311, 456, 662

[56] References Cited

U.S. PATENT DOCUMENTS

| | | | |
|---|---|---|---|
| 3,321,028 | 5/1967 | Groenke | 172/456 X |
| 3,814,191 | 6/1974 | Tilbury | 172/311 |
| 3,944,001 | 3/1976 | Warner et al. | 172/311 |

*Primary Examiner*—Richard T. Stouffer
*Attorney, Agent, or Firm*—D. A. N. Chase

[57] ABSTRACT

An apparatus and method are disclosed for folding an articulated agricultural implement such as a multisection plow in order to facilitate movement of the implement from field to field along available roadways. Stability in the folded condition and minimization of the number of hydraulic cylinders required are achieved through the use of a gravity operated lock arrangement associated with adjacent sections of the foldable wing frame units of the implement. The number of locks and hydraulic cylinders depends upon the total number of hinged sections used to form the base and wing units of the frame assembly. The inboard hydraulic cylinders are pivotally connected to respective draft beams on the base unit and each acts directly between such beam and the associated wing unit. The arms of the hitch are connected to the forward ends of the draft beams, and the arrangement is such that the overturning moment created during folding of a wing unit is opposed by a sufficient equal and opposite force to maintain equilibrium and prevent arching or buckling of the flexible frame sections. The hitch arms converge at a special nose provided with a tongue connector that is continuously adjustable over a wide elevational range to accommodate various tractor drawbar heights. Each gang of a multiple gang treader behind the plow runs askew and is provided with a gang check to limit forward swinging movement and thereby prevent the treader wheels of adjacent gangs from engaging each other and damaging the wheels when terrain irregularities are encountered.

4 Claims, 22 Drawing Figures

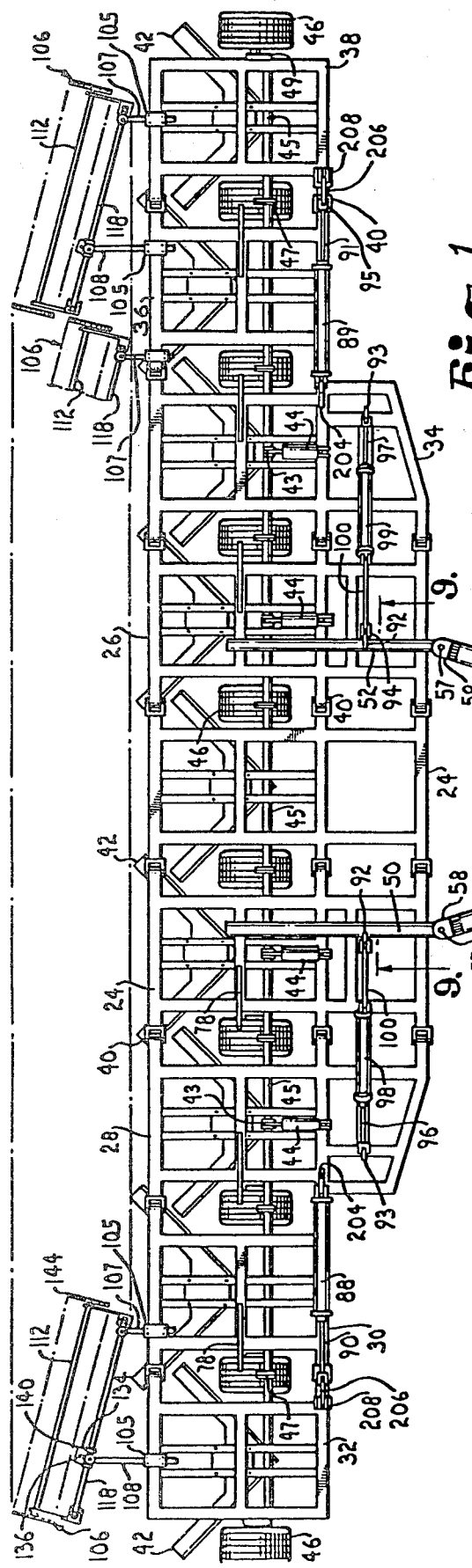
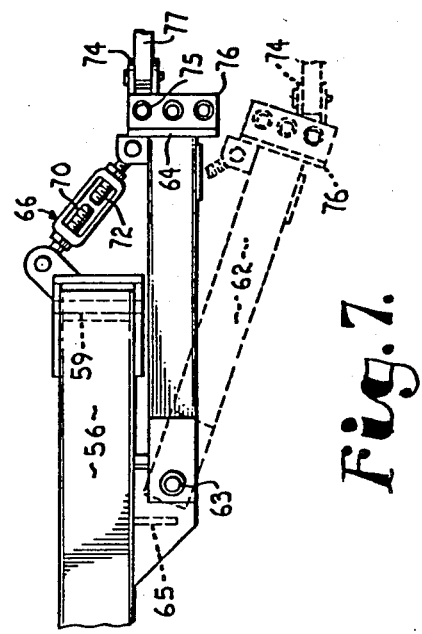
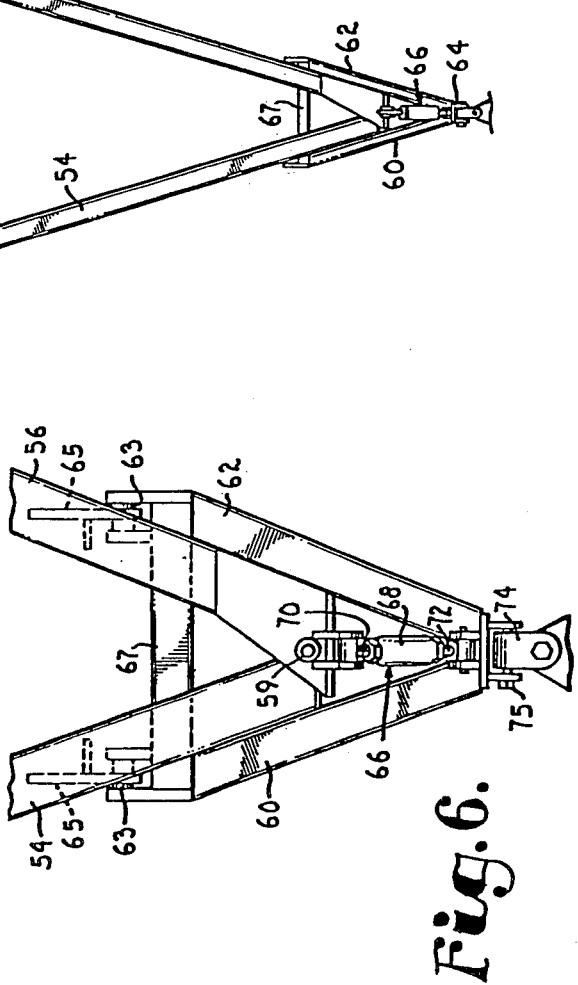

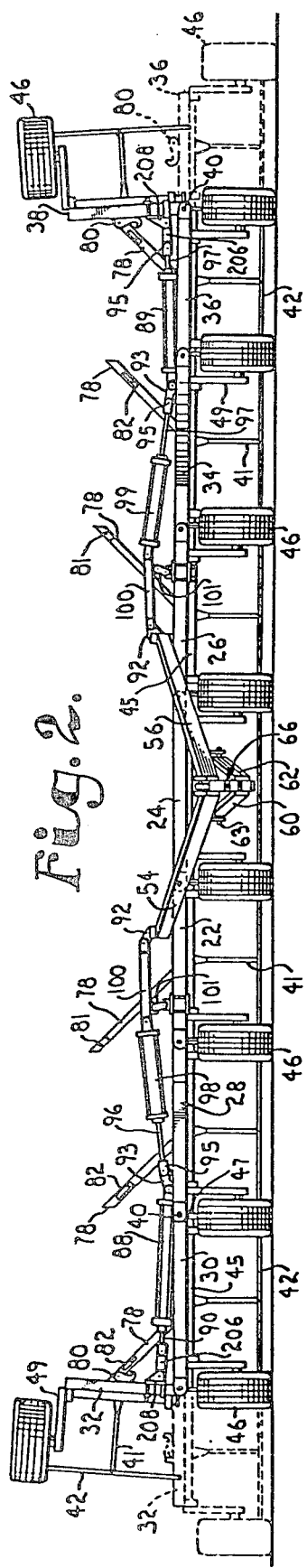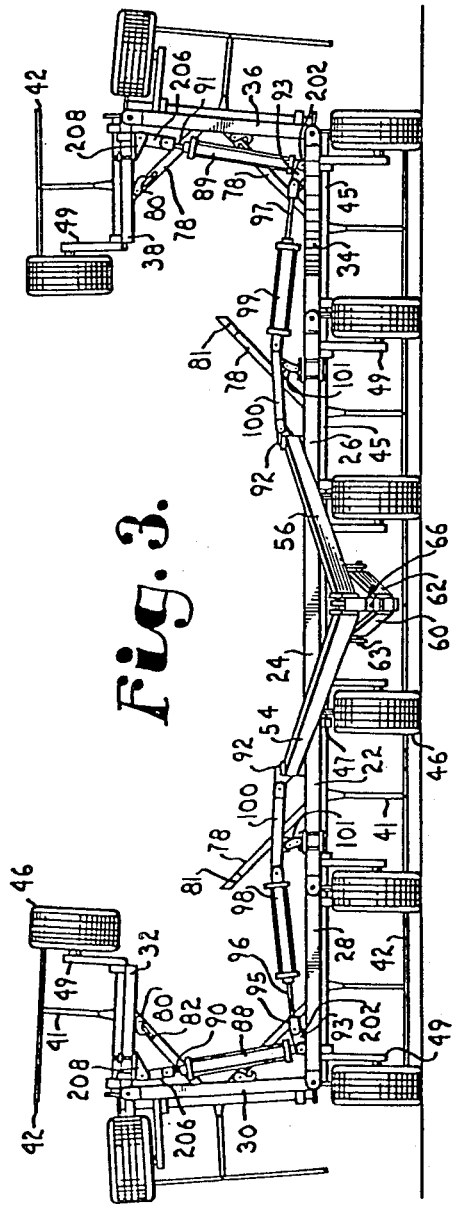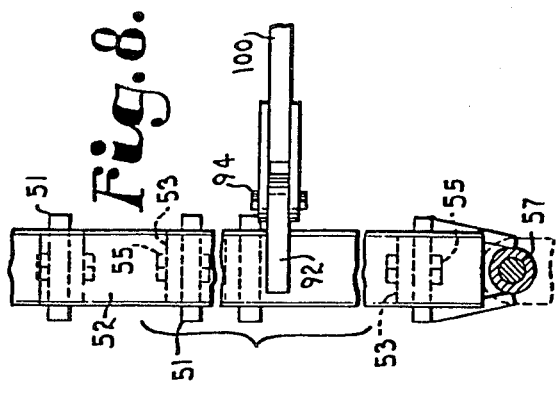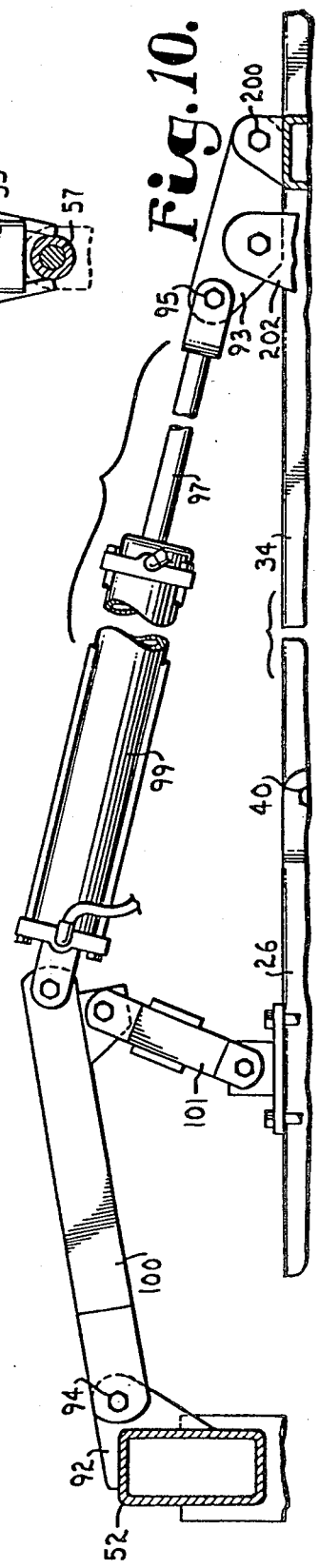

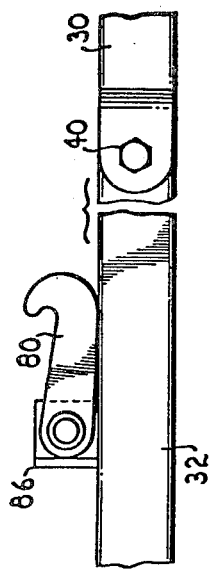
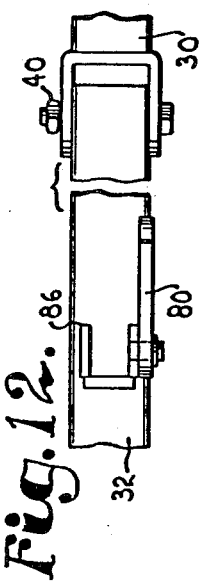
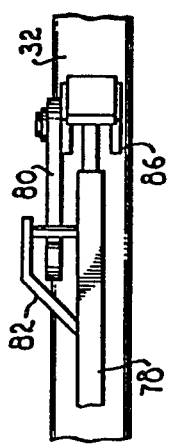
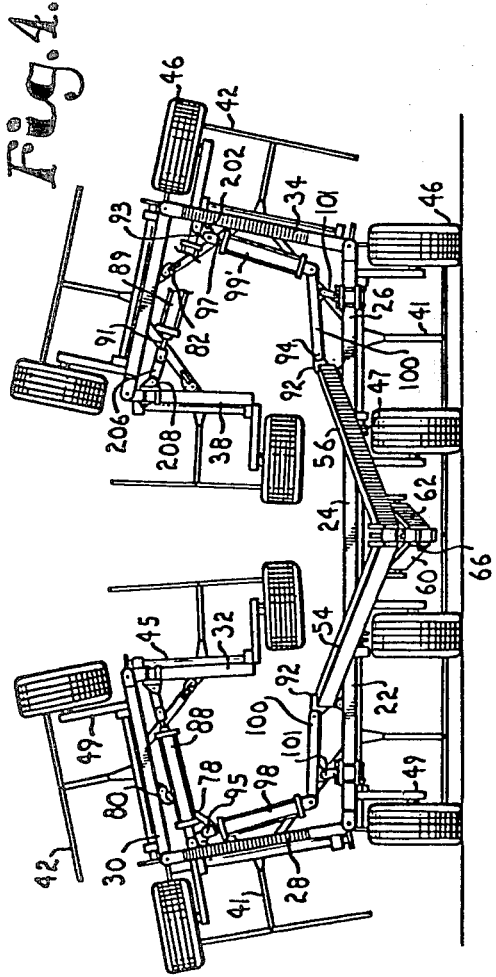
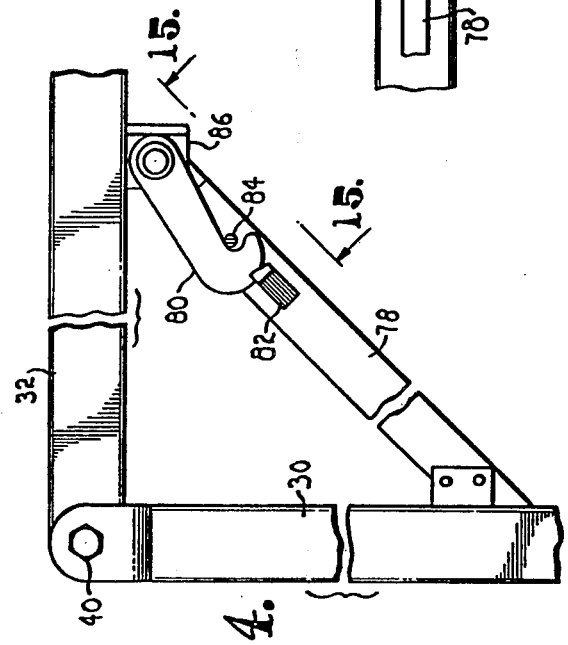
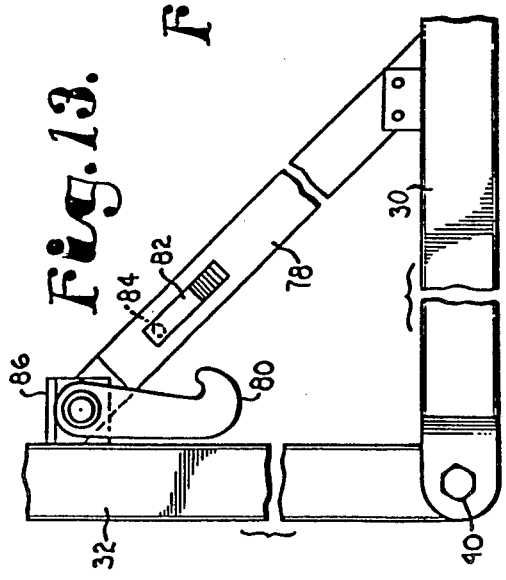

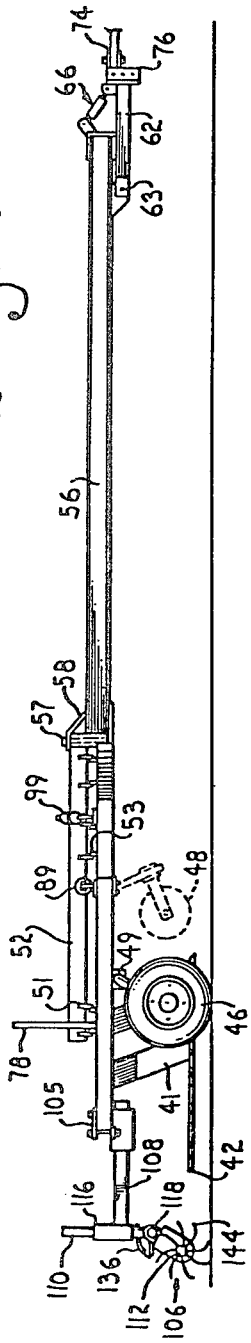
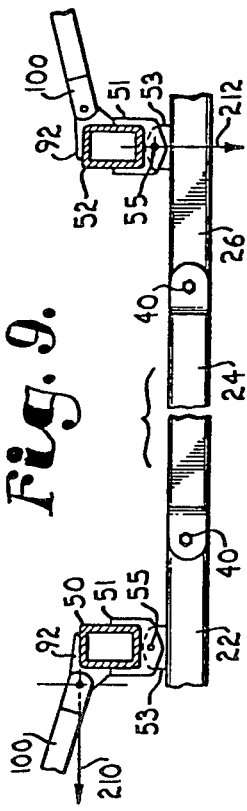
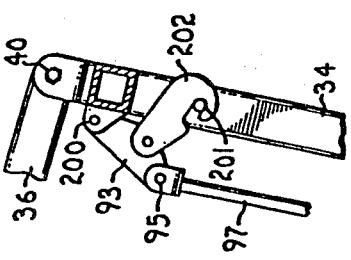
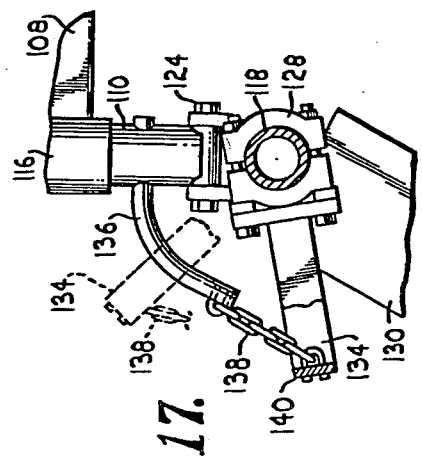
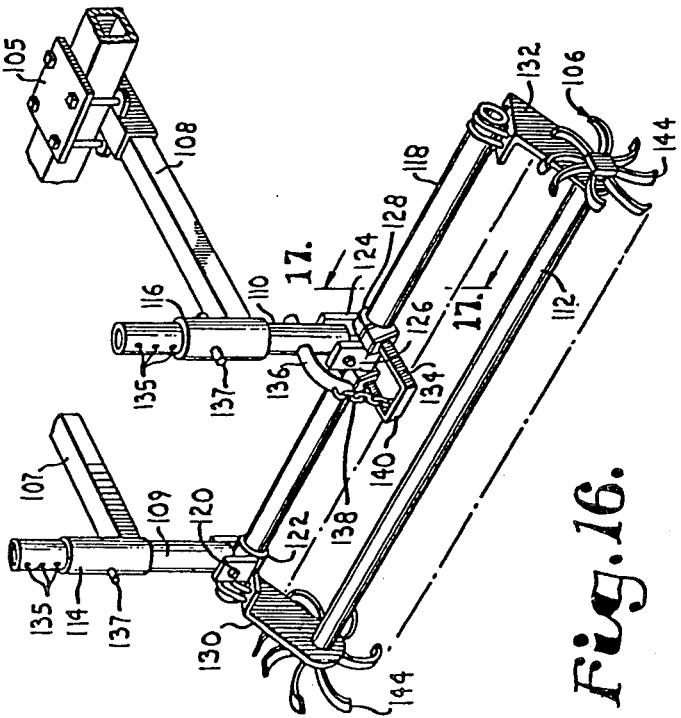

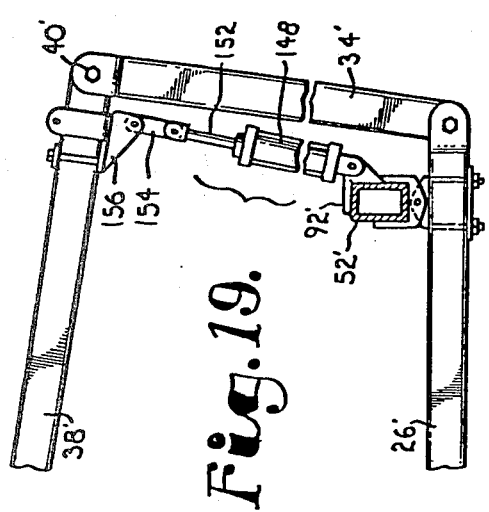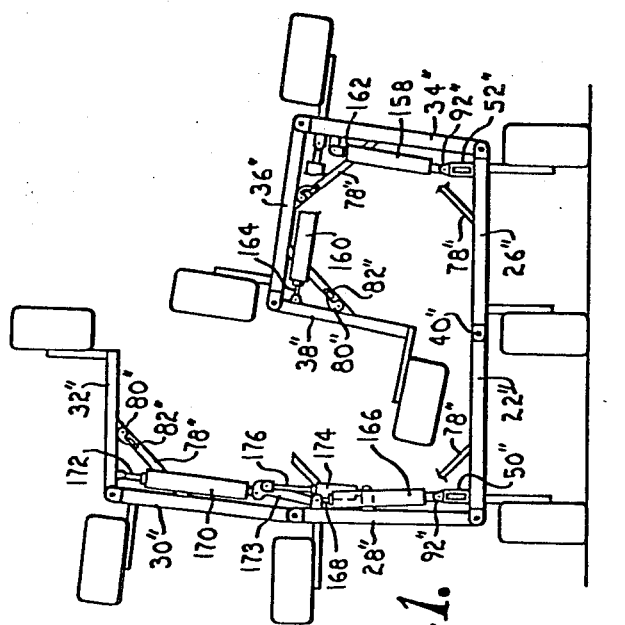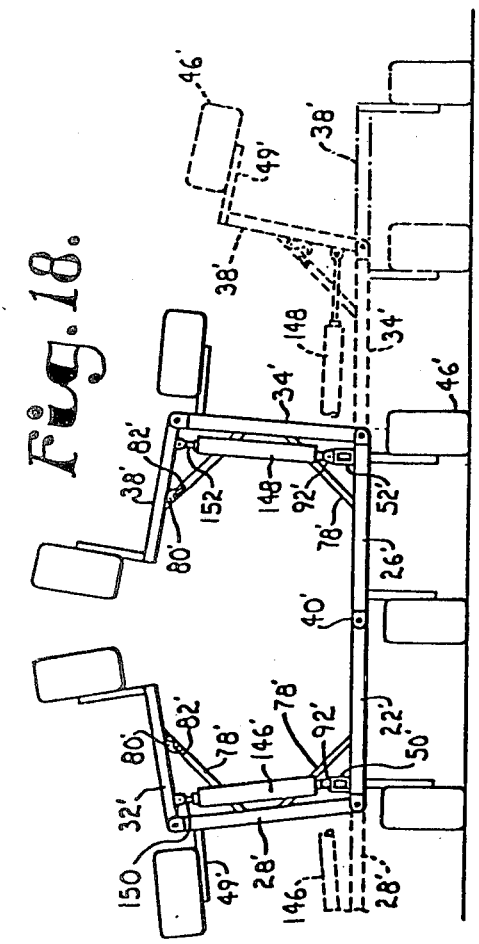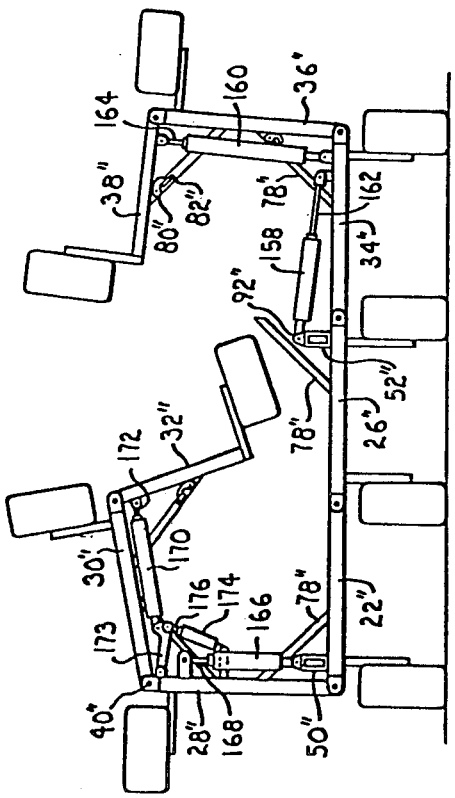

METHOD OF FOLDING A PLURALITY OF WING SECTIONS OF AN ARTICULATED IMPLEMENT

This is a division of application Ser. No. 717,501, filed Aug. 24, 1976, now U.S. Pat. No. 4,133,391.

This invention relates to improvements in articulated agricultural implements and, in particular, to an improved apparatus for folding and unfolding the articulated frame sections and to improvements in the hitch construction and treader gangs pulled behind undercutter plows.

The development and widespread use of increasingly more powerful farm tractors make it possible to draw larger and heavier implements and, therefore, work a larger field area with each pass. Accordingly, the trend in implement design, particularly sweep-blade plows, is to provide additional flexible sections so that the increased tractor horsepower may be advantageously utilized. Multisection implements of this type are well-known in the art and employ a number of side-by-side, hinged sections, each of which is supported by its own ground wheel and carries a sweep blade.

However, the number of sections of an articulated frame plow or other implement may not be increased indefinitely without considering a number of factors, including transport of the implement from one field to another. This requires that the frame sections of wing units of the implement be folded over and above a centrally disposed, base frame unit which is hitched to the tractor drawbar. In order to accommodate available roadways, the unfolded base unit will thus be restricted to two or three frame sections, with the remaining sections in the outboard wing units being folded hydraulically to materially reduce the width of the implement.

When the frame sections of the wing units are folded, very large forces are applied to those sections of the frame remaining on the ground. An overturning moment is inherently developed and must be opposed or arching or buckling of the ground sections can occur. The arching phenomenon is a problem inherent in multisection implements due to their flexible nature, i.e., the use of hinge joints between the sections to enable the side-by-side sections to conform to the configuration of the ground as they are drawn abreast.

One solution to this instability problem during folding of the wing units is to freeze the flexible frames remaining on the ground into an inflexible condition through the use of a hydraulically operated locking arrangement or other means. However, this materially complicates the hydraulics of the overall implement design and significantly increases the cost of an already expensive structural assembly.

Furthermore, as the number of frame sections in the foldable wing units increases, the number of hydraulic cylinders needed to fold the articulated sections likewise increases proportionally in conventional systems. For example, previous implements of this type have employed a hydraulic cylinder for each wing section that is to be swung to a folded position during transport. Accordingly, the addition of sections to enlarge the frame configuration increases the complexity of the hydraulic system on a section-by-section basis, thereby compounding the problems encountered in large multisection implements where a substantial overturning moment may be created as mentioned above.

It is, therefore, an object of this invention to provide a method utilizing support arms employed in conjunction with gravity-operated locks in a manner to control the folding and unfolding of the wing sections and cause the unfolding to occur in reverse sequence.

Another specific and important object of the invention is to provide such a sequence control method wherein locking and unlocking during folding and unfolding occur under the force of gravity as the sections are shifted between completely unfolded and completely folded conditions of the implement.

DESCRIPTION OF THE DRAWINGS

FIG. 1 is a top plan view of a nine-section folding flexible undercutter plow incorporating the improvements of the present invention;

FIGS. 2, 3 and 4 are progressive, front elevational views of the plow of FIG. 1 showing the same in successive stages of folding (fully folded in FIG. 4), the phantom lines in FIG. 2 illustrating the plow fully unfolded as in FIG. 1;

FIG. 5 is a side elevational view of the plow of FIG. 1, also showing a disc colter in phantom lines;

FIG. 6 is an enlarged, fragmentary, top plan view of the nose of the hitch seen in FIG. 1;

FIG. 7 is a side elevational view of the nose of the hitch illustrated in FIG. 6, the adjustability of the tongue connector being depicted in phantom lines;

FIG. 8 is a fragmentary, top plan, detail view of a spanner beam and connecting parts;

FIG. 9 is an enlarged, fragmentary, vertical sectional view taken along line 9—9 of FIG. 1, showing the two spanner beams and associated structure;

FIG. 10 is a detail view in front elevation illustrating the manner in which one of the hydraulic cylinders in FIG. 1 acts between an associated spanner beam and adjacent wing frame section;

FIG. 11 is a detail view in front elevation of a portion of the left wing frame unit and attached gravity operated hook of the plow of FIG. 1;

FIG. 12 is a top plan view of the structure seen in FIG. 11;

FIG. 13 is a fragmentary, detail view in front elevation of the left, outermost section and the adjacent frame section of the plow as seen in FIG. 2 with the outermost section in its folded position and the rolling hook not yet engaged;

FIG. 14 is a fragmentary, detail view similar to FIG. 13 but showing the left outermost section and adjacent section as seen in FIG. 3 with such adjacent section now in its folded position and with the rolling hook engaged, parts being broken away to reveal the locking action;

FIG. 15 is a cross-sectional view taken along line 15—15 of FIG. 14 and illustrates the lock in detail;

FIG. 16 is an enlarged, fragmentary, perspective view of the implement of FIGS. 1–4 as seen from the rear, and illustrates one of the gangs of the treader;

FIG. 17 is an enlarged, fragmentary, transverse cross-sectional view taken along line 17—17 of FIG. 16, and illustrates the gang check in detail;

FIG. 18 is a frontal schematic view of an alternative embodiment of the present invention, showing a six-section folding flexible undercutter plow in its fully folded transport condition in full lines, various stages of folding and unfolding being depicted in phantom lines;

FIG. 19 is an enlarged, fragmentary, front detail view of the right side of the plow shown in FIG. 18, showing a hydraulic piston and cylinder assembly spanning three sections;

FIG. 20 is a frontal schematic view of another alternative embodiment, showing an eight-section folding flexible undercutter plow in one of its folded transport conditions;

FIG. 21 is a view similar to FIG. 20 but illustrates the same plow in a second, alternate folded transport condition; and FIG. 22 is a detail of the fold hook seen fragmentarily in FIG. 10, showing the parts as they appear when the wing unit is fully folded.

THE FRAME ASSEMBLY

The frame assembly for the folding flexible undercutter plow as shown in FIGS. 1–15, with particular clarity in FIGS. 1–4, has nine side-by-side, innerconnected frame sections which may be separated for purposes of description into a base unit having three sections 22, 24 and 26 and two wing units, the left wing unit having sections 28, 30 and 32 with the right wing unit comprising sections 34, 36 and 38. In the base unit, the center base section 24 is between the left base frame section 22 and the right base frame section denoted 26. The left innermost wing section 28 is attached to left base section 22 and to the adjacent, left center wing section 30, the latter being attached to the adjoining outboard section 32 which is the outermost wing section on the left side. In similar fashion, right innermost wing section 34, right center wing section 36, and the outermost wing section 38 on the right side comprise the side-by-side sections of the right wing unit. Throughout the nine-section assembly, adjacent sections are fastened together by hinge connections 40, two such connections 40 being employed between each adjacent pair of wing frame sections. As may be seen in FIG. 1, the frame sections of the base frame unit and the innermost wing sections 28 and 34 are of increased size front to back, thus three hinge connections 40 are employed between each adjacent pair. Each set of two or three hinge connections 40 defines a fore and aft, generally horizontal axis about which corresponding sections may swing to impart the desired flexibility to the frame assembly and, in the case of the wing sections, such axes provide a means whereby each wing section may be swung between a generally horizontal, unfolded position and a folded transport position.

Nine sweep blades 42 are carried by corresponding sections of the nine-section plow and are arranged in an offset series as is clear in FIG. 1. Viewing FIGS. 2–5, it may be seen that each blade 42 is supported on the lower end of a shank 41 depending from the overlying frame section. As is conventional in plows of this type, a disc colter 48 (FIG. 5) is mounted below each frame section in alignment with the nose of the respective sweep blade 42.

Four hydraulic piston and cylinder assemblies 44 are generally horizontally disposed (FIG. 1) and are coupled between the frames of sections 28, 22, 26 and 34 and corresponding cranks 43 on a transversely extending rockshaft 45. Joints 47 employing pivotal connecting links divide the rockshaft 45 into a series of nine end-to-end sections associated with respective frame sections and located just beneath the frame members thereof. The cranks 43 are operable to rotate the rockshaft 45 which, in turn, swings ten legs 49 extending therefrom and mounting respective ground wheels 46. In this manner the wheels 46 are raised or lowered to control the elevation of the sweep blades 42 and thereby set their working depth with respect to the surface of the soil.

The frame assembly for the six-section plow as shown in FIG. 18 is essentially the same as the nine-section plow discussed above except that the center base section of the nine-section plow is omitted and the wing units have only two (innermost and outermost) frame sections. Corresponding components are denoted by the same reference numerals with the addition of the prime notation. The eight-section plow seen in FIGS. 20 and 21 has a two-section base frame as in the six-section plow, but has three-section wing units identical to the nine-section plow except for their manner of folding (to be discussed hereinafter). Components corresponding to the components of the nine-section plow are denoted by the same reference numerals with the addition of the double prime notation. It should be understood that the illustration of FIGS. 18, 20 and 21 are diagrammatic in nature and that parts such as the sweep blades have been omitted for clarity.

THE HITCH STRUCTURE

A draft beam hitch is employed in the present invention and is of the general type disclosed in Richardson, U.S. Pat. No. 3,337,242, issued Aug. 22, 1967. A pair of horizontally disposed draft beams or spanners 50 and 52 extend rearwardly from the front of primary outer frame sections 22 and 26 in overlying relationship to the frame members thereof. The spanners 50 and 52 are each pivotally mounted on the respective outer frame section of the base unit for limited rotation about a fore and aft, generally horizontal axis.

More particularly, with reference to FIGS. 8 and 9 and spanner 52 illustrated therein, a plurality of ears 51 are welded on spanner 52 and depend therefrom, such ears 51 forming parts of a rotatable mount for the spanner 52 that includes upstanding ears 53 on the frame members and associated pivot bolts 55. The upstanding ears 53 and pivot bolts 55 are shown in phantom lines in FIG. 8 as these parts underlie the spanner 52. It may be noted that each depending ear 51 is associated with a respective ear 53 on the frame, and that each such pair of ears is apertured to receive an individual pivot bolt 55. Accordingly, the pivot bolts 55 being in axial alignment, a horizontally extending, fore and aft axis is defined, as mentioned above. Spanner 50 is mounted in the same manner above primary base frame section 22 for limited rotation about a fore and aft axis in parallelism with the rotative axis of spanner 52.

A pair of hitch arms 54 and 56 have their spaced-apart, rearward ends connected to the forward ends of spanners 50 and 52, respectively, by a pair of couplings 58, each of which employs a pintle 57 received in aligned openings in the hitch arm and spanner ends. The forward ends of hitch arms 54 and 56 converge to form a nose (FIG. 6) and are held by an upright pin 59.

A tongue connector is carried by the nose of the hitch and includes a pair of tongue members 60 and 62 which are pivotally mounted beneath respective hitch arms 54 and 56 for swinging movement about a transverse, generally horizontal axis. Such axis is defined by a pair of pivot bolts 63 carried by extensions on the rearward ends of the members 60 and 62 and received in respective through-drilled balls carried by a pair of depending plate elements 65 on the underside of hitch arms 54 and 56. The rearward ends of the members 60 and 62 are braced by a cross member 67.

The tongue members 60 and 62 extend forwardly from the nose presented by hitch arms 54 and 56 and converge at a common front end at 64. A turnbuckle 66 having a link 68 and threaded shanks 70 and 72 is pivotally connected between the nose of the hitch arms and the front end 64 of the tongue connector where the members 60 and 62 converge. A U-shaped strap 74 aligns with any one of three pairs of vertically spaced openings in an upright, channel-shaped bracket 76 on the front end of the tongue members 60 and 62, and is held by a crosspin 75. The tractor drawbar is seen fragmentarily at 77 received within the U-shaped connecting strap 74.

THE FOLDING APPARATUS

Due to the hinge connections 40 which secure the wing sections to each other and the innermost wing sections 28 and 34 to the respective primary outer frame sections 22 and 26, the wing sections may be folded to a transport condition more suitable for travel than the working width of the plow. An upwardly extending arm 78 for supporting each wing section is located on the adjoining inboard section of the frame assembly. On each wing section there is apparatus for fastening the same into a rigid connection with the associated support arm 78. In the nine-section and six-section plows, all but the innermost wing sections 28 and 34 (28' and 34') have exactly the same type of apparatus to place the wing sections in a rigid transport condition by use of gravity operated locks. Each of the wing sections 30, 32 and 36, 38 carries a pivotally mounted, rolling gravity hook 80, and a mating part comprising a bracket 82 and pin 84 for engagement with the hook 80 is located on the corresponding support arm 78. A U-shaped bracket 86 by which the hook 80 is pivotally mounted presents a socket that receives the tip of the associated support arm 78. See FIGS. 11-15.

The innermost support arms 78 mounted on the respective primary base sections 22 and 26, to secure the associated innermost wing sections 28 and 34 in their folded positions, have openings 81 (see FIGS. 2 and 3) through their tips for receiving locking pins (not shown) as gravity hooks are not employed. A U-shaped bracket identical to the type seen at 86 in FIGS. 11-15 is used on each innermost wing section 28 and 34 and receives the tip of the associated support arm 78.

A hydraulic cylinder 88 is attached to the left innermost wing section 28 and its piston rod 90 is attached to the outermost wing section 32. Similarly, on the right wing unit hydraulic cylinder 89 is attached to the right innermost wing section 34 and its piston rod 91 is attached to the right outermost wing section 38. The above actuators fold the outermost and center wing sections into their folded positions. A second pair of actuators fold the innermost wing sections 28 and 34 into their folded positions, thereby placing the plow in its transport condition. The second pair of actuators includes left hydraulic cylinder 98 connected with left primary outer frame section 22, its piston rod 96 being connected to the left innermost wing section 28; and hydraulic cylinder 99 connected with the right primary outer frame section 26, its piston rod 97 being connected to the right innermost wing section 34. See FIGS. 1-4. A link 100 shown in detail in FIG. 10 extends from each spanner 50 and 52 and connects the end of the hydraulic cylinder 98 or 99 directly to the respective spanner. A link bracket 101 pivotally supports each link 100 where the hydraulic cylinder 98 or 99 is pivotally joined to its outer end.

An ear 92 on spanner beam 52 provides a means of directly connecting the cylinder 99 thereto so that the cylinder 99 will act between the spanner 52 and the wing section 34. A clevis and pin arrangement 94 on the inner end of the link 100 provides a pivotal connection to the ear 92; thus pivot points are provided at both ends of the link 100 and at both the upper and lower ends of the link bracket 101 (which is secured at its lower end to the base frame section 26). Likewise, a second ear 92 on spanner beam 50 provides a direct connection thereto for the left link 100 so that the hydraulic cylinder 98 acts between the spanner 50 and the left innermost wing section 28.

FIG. 10 clearly shows the manner in which the piston rod 97 is connected to the right innermost wing section 34. An elongated, generally triangularly shaped flex link 93 has one corner thereof pinned at 200 to a rigid ear on the frame section 34, the piston rod 97 being connected to the opposite corner of the link 93 by a clevis and pin arrangement 95. A fold hook 202 is pivotally attached to link 93 adjacent the remaining corner thereof and depends therefrom. As shown in FIG. 22 where the frame section 34 is illustrated fragmentarily in its folded position, the hook 202 receives a rigid pin 201 projecting from one of the frame members 203 of the frame position 34. Engagement of the hook 202 with the pin 201 occurs just prior to movement of the wing unit over center during folding operation as will be discussed hereinafter. Likewise, a second flex link 93 is employed in an identical manner to connect the piston rod 96 to the left innermost wing frame section 28. Though not revealed in the drawings, it is to be understood that a fold hook arrangement as shown in FIG. 22 is also employed in the left wing unit in the same manner as illustrated for the right wing unit in FIG. 22.

With respect to the outer cylinders 88 and 89, the inner ends thereof are pivotally connected to respective ears 204 (FIG. 1) on the innermost wing frame sections 28 and 34. The laterally outwardly extending piston rods 90 and 91 of such cylinders have their ends joined by clevises and pins to respective flex links 206 that, in turn, are pivotally connected to corresponding lugs 208 on the outermost wing frame sections 32 and 38.

The six-section plow (FIGS. 18 and 19) has folding and unfolding apparatus similar to the nine-section plow except only one hydraulic cylinder is employed for each wing unit and one less support arm is provided due to the decrease in sections. The left and right hydraulic cylinders 146 and 148 are directly pivotally connected to respective ears 92' fixed to spanners 50' and 52'. The piston rod 150 of cylinder 146 is pivotally coupled to the left outermost wing section 32'. Likewise, the piston rod 152 of cylinder 148 is pivotally connected with the right outermost wing section 38'. It should be understood that the illustration of FIG. 18 is a simplified, diagrammatic view presented in order to illustrate the applicability of the teachings of the present invention to articulated implements having various numbers of sections. FIGS. 20 and 21 (to be discussed) directed to the eight-section plow are likewise simplified and diagrammatic in form. Thus, intermediate links such as the flex links 93 and 206 shown in the fully illustrated nine-section plow are eliminated for simplicity and clarity of presentation.

FIG. 19 shows the right cylinder 148 and associated components of the six-section plow in greater detail.

Note that the lower or inner end of the cylinder 148 is pinned directly to the ear 92' on spanner 52'. The piston rod 152 is pivotally coupled by an intermediate flex link 154 to lugs 156 secured to outermost frame section 38' adjacent the hinge connection 40'.

Referring to the eight-section plow of FIGS. 20 and 21, the right wing unit (sections 34", 36" and 38") is folded and unfolded in a manner quite similar to the ninesection plow of FIGS. 1-5. Two hydraulic cylinders 158 and 160 are employed, the inner cylinder 158 being pinned directly to the ear 92" on spanner 52" as in the six-section version. The piston rod 162 of cylinder 158 is connected to the innermost wing section 34"; accordingly, cylinder 158 acts directly between the spanner 52" and the adjacent frame section 34". The cylinder 160 and its piston rod 164 span three sections and act between the innermost section 34" and the outermost section 38".

Now referring to the left wing unit of the eightsection plow, a hydraulic cylinder 166 and its piston rod 168 act between the spanner 50" and the innermost wing section 28". A second hydraulic cylinder 170 has a piston rod 172 and, as is apparent from the illustrations, acts between the innermost section 28" and the outermost section 32" to control the folding and unfolding of the center and outermost sections 30" and 32". A three-pin link 173 having a closed Y configuration is pivotally secured to the innermost frame section 28" adjacent its outboard hinge connections 40", both the anchor end of the cylinder 170 and the piston rod 176 of a third hydraulic cylinder 174 being pinned thereto. The opposite, anchor end of the cylinder 174 is inwardly spaced and pivotally mounted on the innermost section 28". The cylinder 174 has a special function in connection with the alternate folded transport condition shown in FIG. 21.

The support arms 78" and corresponding rolling gravity hooks 80" and mating brackets 82" are arranged in identical fashion as in the nine-section plow, except on the left wing unit the middle support 78" is not engaged and locked by a rolling gravity hook during folding and unfolding operation. A lock is not desired at this point in the eight-section version due to the special function of the third hydraulic cylinder 174 to be discussed hereinafter.

THE TREADER AND GANG CHECK

Referring to FIGS. 1, 5, 16 and 17, a six-gang treader is drawn behind the plow frame assembly. Each gang is generally denoted by the numeral 106 and runs askew with respect to the line of draft of the implement. Six pairs of rearwardly extending booms 107 and 108 attach the six gangs 106 to the frame and are appropriately spaced along the frame sections in accordance with the widths of the gangs. The arrangement is identical for each gang 106 and is shown in detail in FIG. 16.

Each of the booms 107 and 108 is attached to the plow frame by a connecting clamp 105. A pair of upright, depth adjustment pipes 109 and 110 are held on the rearward ends of booms 107 and 108 respectively by sleeves 114 and 116 rigid with the booms. The lower end of the pipe 109 is attached to a gange beam 118 by a mounting 120 having a sleeve 122 receiving the gang beam 118. The lower end of pipe 110 also supports the gang beam 118 and is provided with a mounting 124 at its lower end having a sleeve 126 receiving beam 118. Accordingly, the gange beam 118 is permitted by the aligned sleeves 122 and 126 to rotate about its longitudinal axis. End brackets 130 and 132 depend from the opposed ends of gang beam 118 and support a gang shaft 112 upon which the treader wheels 144 turn. Axial sliding of the beam 118 within the sleeve 126 is precluded by split collars 128 on opposite sides of the sleeve 126, such collars are serving to mount a U-shaped arm 134, the ends of which are rigidly held on the beam 118 by the split collars 128.

An elbow bar 136 projects rearwardly and downwardly from the lower portion of the pipe 110 and terminates short of the bight 140 of the U-shaped arm 134 (FIG. 17). A chain 138 forms a flexible link between the bight 140 and the end of the elbow bar 136.

The operating depth of the series of treader wheels 144 is set by adjustment of the pipes 109 and 110, each of the latter being provided with a vertically spaced series of holes 135. Cross pins 137 insertable through sleeves 114 and 116 are received in selected holes 135 to set the operating depth.

OPERATION

Hydraulic power for the various piston and cylinder assemblies used in the folding and unfolding apparatus of the present invention is typically provided by a hydraulic source onboard the tractor that draws the implement. Modern tractors are equipped with hydraulic systems having sufficient capacity to handle the nine-section plow illustrated herein, which may be folded one wing at a time or folded by simultaneous actuation of the hydraulic cylinders of both wing units.

Referring to FIGS. 1-15, the hydraulic cylinders 88 and 98 of the left wing unit are fed in parallel by hydraulic supply lines (not shown). The outer cylinder 88 will act first since it encounters less resistance than the inner cylinder 98 (the outer cylinder 88 is only initially required to swing the outermost wing section 32). The hydraulic cylinders 89 and 99 of the right wing unit are operated in the same manner and the two wings fold in identical fashion. Accordingly, only the folding and unfolding of the left wing unit will be discussed in detail.

In FIG. 2 it may be seen that the outermost frame section 32 has been swung from its normal, unfolded position (phantom lines) to its folded position by the retracting of the piston rod 90. As the section 32 reaches its folded position, it comes to rest against the tip of the outer support arm 78, such tip being received within the socket provided by the U-shaped bracket 86 on section 32. This is shown in detail in FIG. 13, it being understood that this figure and FIG. 14 are idealized views showing an exact orthogonal relationship whereas, in practice, the angle formed by the yet-unfolded center section 30 and the folded outermost section 32 is somewhat acute.

At this juncture, it should be noted that the hydraulic cylinder 88 and associated piston rod 90 span three sections and thereby bridge the center section 30 to which no connection is made. Therefore, continued retraction of the piston rod 90 causes folding to now occur about the second hinge axis (the hinge connections 40 joining sections 28 and 30). FIGS. 3 and 14 show center section 30 in its folded position where it now engages the tip of the second support arm 78 extending upwardly and outwardly from the innermost frame section 28.

During movement of th center section 30 from its unfolded position in FIG. 2 to the folded position thereof shown in FIG. 3, the rolling gravity hook 80 carried by the outermost section 32 swings into engagement with the associated pin 84 carried by the first or outer support arm 78 (compare FIGS. 13 and 14). As will be seen hereinafter, this locking action of the hook 80 and pin 84 controls the sequencing during unfolding operation to assure that the outermost section 32, though first to fold, is the last to unfold.

The left wing unit having reached the partially folded condition illustrated in FIG. 3, the hydraulic cylinder 88 encounters infinite resistance as sections 32 and 30 are fixed in their positions by the associated support arms 78. Accordingly, the inner hydraulic cylinder 98 begins to retract its piston rod 96 and swing the final, innermost section 28 to its folded position shown in FIG. 4. As was just discussed with reference to FIGS. 13 and 14, the rolling hook 80 carried by the center section 30 swings under the influence of gravity into locking engagement with the pin on the associated support arm 78.

Once the innermost section 28 reaches the folded position thereof shown in FIG. 4, it engages the inner support arm 78 and motion ceases. Although the wing unit is held in place since the swinging assembly moved over center as it shifted from the FIG. 3 to the FIG. 4 condition, it is desirable that precautions be taken to assure that the wing will not inadvertently unfold should rough terrain be encountered in transport and hydraulic pressure be lost. To this end, a simple manual lockout is provided by the opening 81 through the tip of the inner support arm 78. The operator inserts a locking pin (not shown) through opening 81 and the aligned openings in the U-shaped bracket on section 28 which, though not illustrated, is identical to the bracket 86 shown in detail in FIGS. 11-15.

From the foregoing, it may be appreciated that the outermost support arms 78 of the wing frame units make it possible for the outer cylinders 88 and 89 to fold both the outermost sections 32 and 38 and the center sections 30 and 36. The operation of the rolling hooks 80 is also important in the folding process as will be apparent upon consideration of the unfolding sequence.

In the folding operation, the sequence is illustrated by the progressive views of FIGS. 1 through 4. The outermost section is first folded; then both the outermost and center sections swing in unison to the folded position of the center section, and finally all three wing sections move to the fully folded condition of FIG. 4. In unfolding each wing unit, the sequence is exactly reversed and FIGS. 4 through 1 progressively illustrate the unfolding operation.

To unfold the left wing unit, the hydraulic cylinders 88 and 98 are simultaneously activated to extend their piston rods. However, viewing FIG. 4, it may be seen that the rolling hook 80 carried by the outermost section 32 is engaged and that, therefore, the outermost section 32 and the center section 30 are interlocked. Accordingly, only the cylinder 98 can extend its piston rod 96, the operator having, of course, removed the manual lockout pins. The innermost section 28 is thus caused to unfold and the frame assumes the FIG. 3 condition. However, the rolling hook 80 carried by the center section 30 unlocks just before the innermost section 28 reaches it fully unfolded position. Since the hook 80 carried by the outermost section 32 remains locked, the outer hydraulic cylinder 88 now unfolds the center section 30 followed by unfolding of the outermost section 32 once its lock is released. In this regard, note in FIG. 2 that the hook 80 carried by the outermost section 32 has swung free of the associated bracket 82, this having occurred just before the center section 30 reached its unfolded position. Accordingly, the gravity operated, rolling hooks 80 control the unfolding sequence positively and safely without the necessity to employ special hydraulic controls. The right wing unit sequentially unfolds in identically the same manner.

At this juncture it should be appreciated that the flex links 93 and 206 enable the articulated frame assembly to operate in the usual manner when unfolded in the field position. If these flex links were eliminated and replaced by direct connections of the piston rods to the ears or lugs, the articulated assembly would be locked by the hydraulic system once unfolded. Each flex link provides an additional pivot point to prevent a binding, three-point linkage from being established. These intermediate links, however, do not interfere with folding operation since they communicate the driving force of the piston rods once the lost motion is taken up and the links are placed in tension.

During unfolding operation when the piston rods are extending, the flex links 206 at certain stages of unfolding will collapse against the frame members to which the lugs 208 are secured, but this does not impede the operation of the outer cylinders 88 and 89. With respect to the flex links 93 associated with the inner cylinders 98 and 99, these are initially held during unfolding by the fold hooks 202 (FIG. 22). The fold hooks 202 swung by gravity into engagement with pins 201 during folding operation just before the wing units moved over center as they approached the fully folded, FIg. 4 condition.

Now referring to FIG. 9, an arrow 210 through the pivotal connection of link 100 to ear 92 represents the force applied by the left wing unit during folding operation. The arrow 210 extends horizontally outwardly in the direction of such wing unit and acts through a vertical moment arm measured from the axis of pivot bolts 55. The moment thus created is an overturning moment, i.e., a force which tends to lift the base frame unit and the right wing unit of the frame assembly off the ground. Manifestly, this overturning moment created as the left wing is raised must be opposed in order to maintain the frame system in equilibrium. Otherwise, arching or buckling of the ground sections will occur at the hinge connections 40.

A vertically downwardly directed arrow 212 through the fore and aft axis defined by the pivot bolts 55 beneath the right spanner 52 represents the static weight of the ground frames. This is the force that must counteract the force represented by the arrow 210. It does so in the present invention by virtue of the relatively long moment arm through which the downwardly directed force 212 acts; such moment arm extends essentially completely across the base frame unit from the fore and aft rotative axis beneath spanner 50 to the rotative axis beneath spanner 52. It may be appreciated that this moment arm is very long relative to the short arm through which force vector 210 acts. In the present invention the long moment arm for vector 212 is established so that the weight of the ground frames is more than adequate to stabilize the structure during the folding operation.

This is accomplished by the spanner beams 50 and 52 and the hitch arms 54 and 56 which, in effect, cooperate to freeze the hinge connections 40 between the frame sections of the base unit. Due to the left link 100 which directly connects the hydraulic cylinder 98 to the ear 92 on the spanner 50, the force is likewise directly transmitted to the spanner 50 and not to outboard frame sections. The spanner 50 is placed in torsional stress since the hitch arms 54 and 56 do not permit the spanner 50 to rotate freely around the underlying fore and aft axis defined by the pivot bolts 55. The pintles 57 connecting the hitch arms 54 and 56 to the spanners 50 and 52, and the nose pin 59 of the hitch resist the shear stresses thus imposed; accordingly, the overturning moment is resisted and a compensating moment arm through which the opposing force 212 may act is provided by the innerconnected spanners.

With respect to the nose of the hitch best seen in FIGS. 6 and 7, the continuous adjustability of the turnbuckle 66 makes it possible to readily accommodate the drawbar height of the particular tractor utilized. The tongue connector with its converging members 60 and 62 is swingable as illustrated about the horizontal axis defined by the bolts 63, and precise placement of the connecting strap 74 is assured by the turn-buckle adjustment. Furthermore, larger incremental adjustments may be made by selecting the desired pair of holes in the nose bracket 76 for the cross pin 75 (compare the full and broken line illustrations in FIG. 7).

Referring to FIGS. 1 16 and 17, it should be understood that the treader gangs 106 do not bind during folding and unfolding of the implement even though the booms 107 and 108 may extend from different sections. The gang beam 118 of each treader gang 106 is free to slide within the sleeve 122 as the spacing between booms 107 and 108 varies during folding and unfolding.

Since the treader gangs 106 run askew and their adjacent ends overlap somewhat in the direction of movement of the implement (FIG. 1), it is possible for the treader wheels 144 of adjacent gangs 106 to inadvertently mesh and become damaged if terrain irregularities are encountered and one gang 106, for example, is momentarily raised off the ground. This is precluded in the present invention by the gang check provided by chain 138 and the U-shaped arm 134. The arrangement limits the range of rotation of the gang beam 118 about its longitudinal axis, thereby also limiting the range of arcuate, forward and rearward travel of the gang shaft 112. Maximum forward movement is illustrated in FIG. 17 in full lines where it is seen that the chain 138 is drawn tight between the elbow bar 136 and arm 134. The phantom line illustration reveals that rearward movement is also limited (clockwise about the axis of gang beam 118 as viewed in FIG. 17).

In the six-section version illustrated in FIGS. 18 and 19, folding and unfolding operation is analogous to that as described above with respect to the nine-section plow. The phantom line illustrations reveal the fully unfolded condition of the right wing and the folded position of the outermost wing section 38'. Sequencing is the same as discussed with respect to the center and outermost sections of each wing of the nine-section plow; one structural difference, of course, is that the hydraulic cylinders 146 and 148 are directly pivotally connected to spanners 50' and 52'. As in the nine-section plow, therefore, the overturning moment created during folding of a wing unit is opposed by a sufficient equal and opposite force to maintain equilibrium and prevent arching or buckling, due to the action of the spanners 50' and 52' and associated hitch arms (not shown).

The eight-section version shown diagrammatically in FIGS. 20 and 21 has a special feature as illustrated by the alternate folded condition of FIG. 21. The operator has a choice of either three frame sections (FIG. 20) or two frame sections (FIG. 21) on the ground. Special sequencing is employed in the left wing unit. The hydraulic cylinder 170 folds both the outermost section 32" and the center section 30" with the link 173 held by hydraulic cylinder 174 in the position illustrated in FIG. 20. The inner cylinder 166 folds the innermost section 28". If it is desired to further reduce the width of the assembly to two ground sections as in FIG. 21, the cylinder 174 is activated after the left wing unit is folded in order to swing the link 173 upwardly as seen in FIG. 21 and thereby move the two inboard sections 28" and 30" into nearly vertical alignment. This permits hydraulic cylinder 158 to be activated to swing the right innermost wing frame section 34" to its folded position.

Having thus described the invention, what is claimed as new and desired to be secured by Letters Patent is:

1. A method of folding a plurality of wing frame sections of an articulated implement, said method comprising the steps of:
   swinging the outermost section to a folded position;
   supporting said outermost section in said position in fixed relationship to the adjoining inboard section;
   swinging said outermost and adjoining sections in unison to a folded position of said adjoining section;
   automatically interlocking said outermost and adjoining sections as the same are swung in unison to said folded position of the adjoining section; and
   continuing to swing said outermost and adjoining sections, support the same on each succeeding inboard section, and automatically interlock each succeeding adjacent pair of sections until said wing frame sections are fully folded.

2. A method of unfolding a plurality of wing frame sections of an articulated implement, wherein said sections have been folded in accordance with the method set forth in claim 15, said unfolding method comprising the steps of unfolding said sections in reverse sequence, and automatically sequentially releasing the interlocks as the sections unfold.

3. A method of folding a plurality of wing frame sections of an articulated implement, said method comprising the steps of:
   (a) swinging the outermost section to a folded position;
   (b) supporting said outermost section in said position in fixed relationship to the adjoining inboard section;
   (c) swinging said outermost and adjoining sections in unison to a folded position of said adjoining section;
   (d) automatically interlocking said outermost and adjoining sections during said step (c) by providing said outermost and adjoining sections with a lock that acts in response to swinging movement of said sections; and
   (e) continuing to swing said outermost and adjoining sections, support the same on each succeeding inboard section, and automatically interlock each succeeding adjacent pair of sections with a movementresponsive lock until said wing frame sections are fully folded.

4. A method of unfolding a plurality of wing frame sections of an articulated implement, wherein said sections have been folded in accordance with the method set forth in claim 3, said unfolding method comprising the steps of unfolding said sections in reverse sequence, and causing said locks to automatically sequentially release in response to swinging movement of said sections as they unfold.

* * * * *

UNITED STATES PATENT AND TRADEMARK OFFICE
CERTIFICATE OF CORRECTION

PATENT NO. : 4,204,575
DATED : May 27, 1980
INVENTOR(S) : RAYMOND W. RICHARDSON et al

It is certified that error appears in the above—identified patent and that said Letters Patent is hereby corrected as shown below:

In the preliminary information, under "Related U. S. Application Data," change the patent No. from 4,133,341 to 4,133,391.

Column 2, line 4, delete "specific and".

Column 12, claim 2, fourth line thereof, delete "15" and substitute --1--.

Column 12, claim 3, subsection (e), fifth line thereof, insert a hyphen between "ment" and "responsive".

Signed and Sealed this

Twelfth Day of August 1980

[SEAL]

Attest:

SIDNEY A. DIAMOND

Attesting Officer

Commissioner of Patents and Trademarks